Nov. 24, 1925.
R. D. ESCOMBE
1,562,824
SPRING SUSPENSION OF VEHICLE WHEELS
Filed March 27, 1922
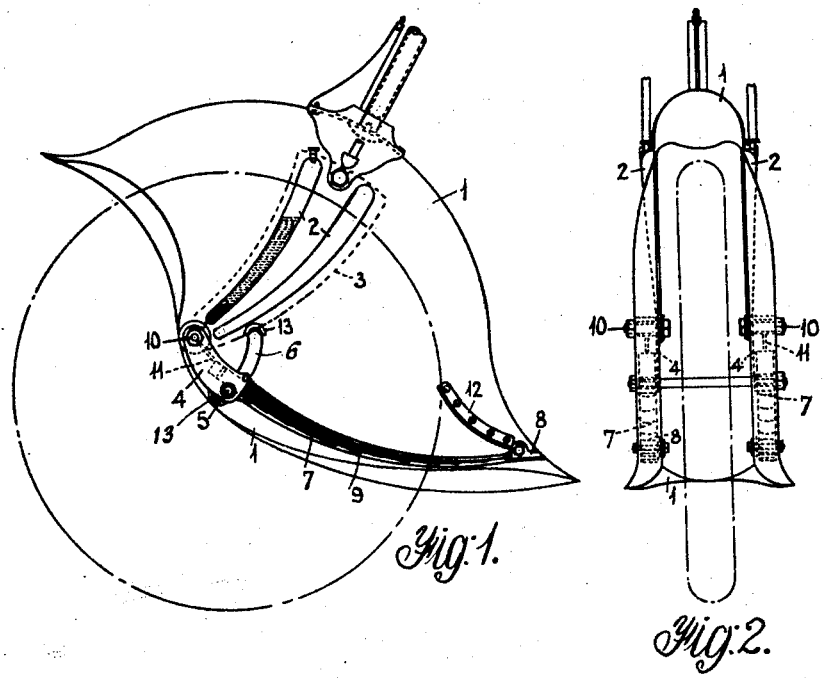
INVENTOR.
Robert Douglas Escombe.
by  A.E.Odell
Attorney.

Patented Nov. 24, 1925.

1,562,824

UNITED STATES PATENT OFFICE.

ROBERT DOUGLAS ESCOMBE, OF SEVENOAKS, KENT, ENGLAND.

SPRING SUSPENSION OF VEHICLE WHEELS.

Application filed March 27, 1922. Serial No. 547,296.

*To all whom it may concern:*

Be it known that I, ROBERT DOUGLAS ESCOMBE, a subject of the King of Great Britain and Ireland, residing at 3 South Park, Sevenoaks, Kent, England, have invented new and useful Improvements in and Relating to Spring Suspension of Vehicle Wheels (for which I have filed application in England on the 5th April, 1921, No. 9990/1921, and cognate application No. 252/1922, filed the 4th January, 1922), of which the following is a specification.

This invention relates to the suspension and springing of vehicle wheels, and more especially of the front wheels of motor cycles. Its object is the production of a highly resilient wheel mounting with a convenient disposition of the springing. A further object is to achieve a graduated resilience in the mounting, so that the wheel yields with increasing stiffness as its displacement from normal position increases.

With these objects in view the axle of the vehicle wheel is carried upon a short lever pivoted to the vehicle frame, and a laminated spring is secured at one end to said lever, its other end bearing upon the frame so that it constantly exerts pressure between the frame and the lever to resist rotation of the lever on its pivot when shocks come upon the wheel.

The invention further comprises a lever pivoted on the vehicle frame and carrying a vehicle wheel, and a spring fast at one end to said lever and bearing at its other end upon a part of the frame which is so shaped that the effective length of the spring diminishes as the spring yields.

In a preferred embodiment of the invention for motor cycles, and especially for the front wheels thereof, a sheet metal mud-guard is suitably strengthened by flutings to serve as the frame member on which the spring bears; and said mud-guard may further be extended and strengthened by a valance to serve as the fork and to carry the pivoted lever.

In the accompanying drawings:—

Figure 1 is a side elevation and

Figure 2 a front elevation of the construction of the suspension for the front wheel of a motor cycle.

In the construction illustrated the front fork is formed by a sheet-metal mud-guard 1, which has a deep valance extending down to the axle of the wheel. The mud-guard is strengthened by stamped ribs or flutings 2 near the normal position of the fork. A sheet of metal 3 riveted on the inner side of the mud-guard, serves to form these hollow ribs into reservoirs, one of which is shown as fitted with a cap through which oil may be poured in.

At the lower end of these ribs, there is fitted upon the mud-guard, on each side, a lever 4, which carries at 5 the spindle of the vehicle wheel; the mud-guard has an arcuate slot 6 concentric with the pivot of lever 4 to permit the passage of this spindle. In the lever 4 there is inserted the root end of a laminated spring 7 the other end of which is inserted in and bears against the bracket or slipper 8 pivoted upon the mud-guard. The spring is shown as surrounded by an oil tight casing 9, the outer side of which is shown in Figure 1 as broken away. The aperture at the bottom of the reservoir formed by the rib 2 admits oil to the pivot 10 on which the lever 4 rocks and through the passage 11 in the lever to the end of the spring 7. Adjacent to the pivot of the bracket 8 there is preferably secured upon the mud-guard a curved bearing surface 12 to which the spring 7 will gradually apply itself as it is bent, so that its effective length is shortened by the bending. A suitable buffer 13 may be provided, for instance at one or both ends of the slot 6, to form a positive limit to the deflection of the lever 4.

I claim:—

1. In a motor cycle the combination with the fork of a lever of much less length than the wheel radius pivoted upon the fork at one end, a wheel having its axle supported by the other end of said lever, and a laminated spring directly and rigidly attached to said lever at said other end and prolonging it and bearing upon a fixed part of the cycle.

2. In a vehicle the combination with the vehicle frame of a lever pivoted upon the frame, a wheel having its axle supported by said lever, a quarter elliptic spring having one end rigidly attached to said lever, and a cam surface rigidly secured upon the frame at the point of contact of said spring with said frame adapted to shorten the effective length of said spring as it bends.

3. In a motor cycle the combination with the front steering column of a valanced sheet metal mud-guard attached thereto, a lever pivoted upon said mud-guard, a wheel having its axle carried by said lever and a spring having one end rigidly attached to said lever and the other end bearing on said mud-guard.

4. In a vehicle the combination with the vehicle frame of a lever pivoted thereon, a vehicle wheel having its axle carried by said lever, and a quarter elliptic spring rigidly secured to said lever, the other end of said spring bearing upon a part of the vehicle frame shaped to shorten the effective length of the spring as it bends.

5. In a motor driven cycle the combination with a front steering column of a valanced sheet metal mud-guard attached thereto, levers pivoted in said mud-guard, a wheel having its axle carried by said levers, and quarter elliptic springs each having one end fast in one of said levers, and the other end bearing upon said mud-guard.

6. In a motor cycle the combination with the cycle frame of a ribbed sheet metal mud-guard, a plate attached to said mud-guard closing the interior of one of its ribs to form an oil reservoir, levers pivoted upon said mud-guard, quarter elliptic springs secured in said levers and bearing upon said mud-guard, and a vehicle wheel having its axle supported by said levers, said levers having a channel therein to admit oil from said reservoir to their pivots and to said springs.

7. In a motor cycle the combination with the cycle frame of a lever pivoted upon said frame, a wheel having its axle carried by said lever, a spring secured to said lever and bearing upon the frame and a curved surface upon said frame adjacent the point of bearing of said spring adapted to shorten the effective length of said spring as it bends.

In testimony whereof I have signed my name to this specification.

ROBERT DOUGLAS ESCOMBE.